C. F. HIGH.
STORAGE BATTERY CELL.
APPLICATION FILED NOV. 22, 1920.

1,413,226.

Patented Apr. 18, 1922.
2 SHEETS—SHEET 1.

Witness:
R. E. Weber

Inventor:
Carl F. High
By Young & Young
Attorneys

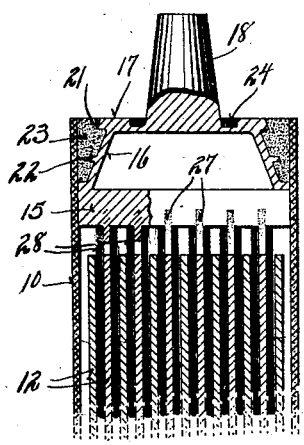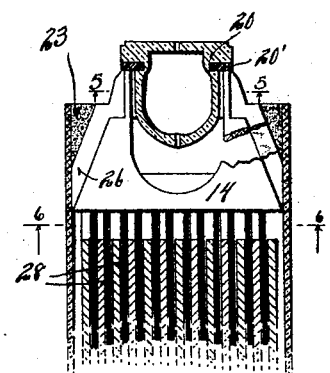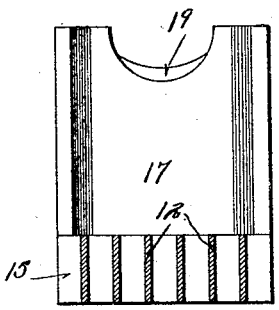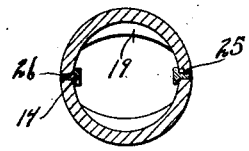

UNITED STATES PATENT OFFICE.

CARL F. HIGH, OF MADISON, WISCONSIN.

STORAGE-BATTERY CELL.

1,413,226. Specification of Letters Patent. Patented Apr. 18, 1922.

Application filed November 22, 1920. Serial No. 425,754.

*To all whom it may concern:*

Be it known that I, CARL F. HIGH, a citizen of the United States, and resident of Madison, in the county of Dane and State of Wisconsin, have invented certain new and useful Improvements in Storage-Battery Cells; and I do hereby declare that the following is a full, clear, and exact description thereof.

My invention relates to cells for storage batteries, and its objects are to construct a cell which will be more durable than those now known and in which the plates will be securely held in their proper position, and in which provisions are made to counteract the effects of acid creepage.

I accomplish these objects by an improved form of cover and improved means for securing the plates, and by the provision for and use of an alkaline or oily substance to counteract the creeping acid and its harmful effects as will more fully appear from the following description, and which will be particularly pointed out in the claims.

In the accompanying drawings, which form a part of this specification:

Figure 3 is a section taken substantially on the line 3—3 of Figure 1, with a part broken away to show the grouping strap.

Figure 4 is a section taken on the line 4—4 of Figure 1.

Figure 5 is a section on the line 5—5 of Figure 4 looking upward, and

Figure 6 is a section on the line 6—6 of Figure 4 looking upward.

Figure 1:
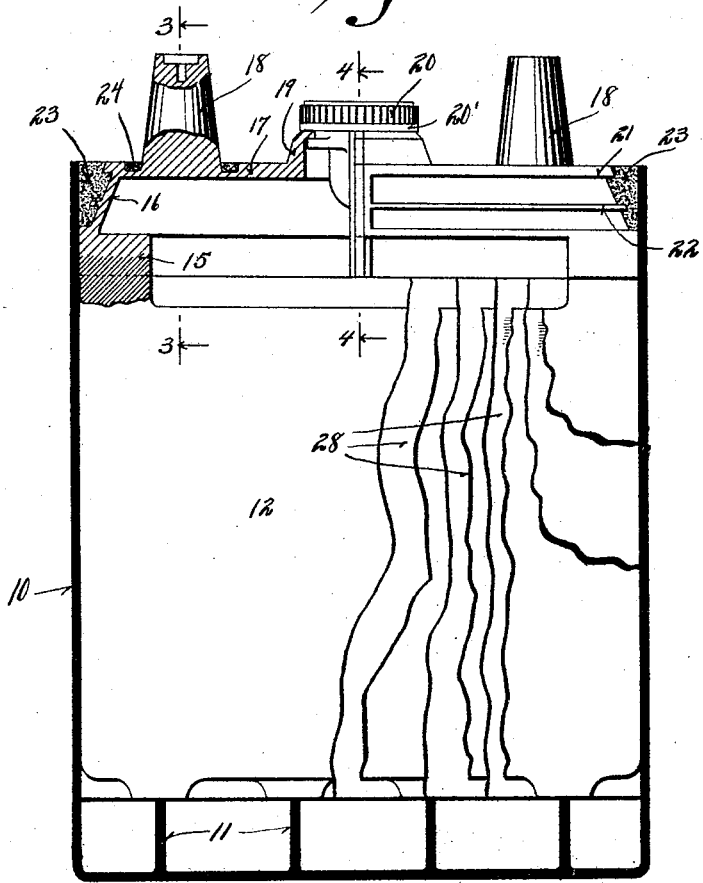
Figure 1 is a vertical section with parts shown in elevation in order to better illustrate the device.
Figure 2:
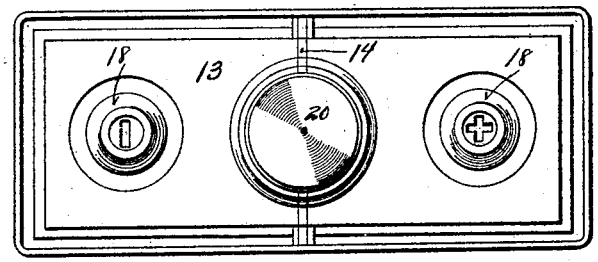
Figure 2 is a plan view.

The cell comprises a jar 10, having in its bottom the upstanding flanges 11, which support the plates 12 and the separators 28 which insulate them. The cover 13 is made up of two equal sections to one of which are attached the positive plates and to the other the negative plates. These sections are separated by the insulating member 14. Each of the cover members comprises the base portion or group strap 15, the sloping portion 16 and the top portion 17 which supports the binding post 18 and is formed with the flange and lip 19 to which is secured the plug 20. The rubber washer 20′ is provided for securing a tight connection. The sloping portion is provided with projections of any suitable shape or design, such, for example, as the ribs 21 and 22, and is coated with any special compound which will firmly adhere to the same, thus providing means for firmly maintaining the cover after the sealing material 23 is poured in. The top member 17 is provided with an annular channel surrounding the binding post 18, which channel is filled with an alkaline or oily substance 24.

The spacing and insulating member 14 has upwardly projecting members 25 which form a complete insulation between the two parts of the cover, and it may be so shaped that it holds the two parts of the cover which have been shaped to receive it from practically any displacement. The insulating member is also formed with sloping sides and ribs 26 in order that it may be firmly held in position by the sealing material 23.

In making my improved cell the entire cover member comprising the parts 15, 16, 17, 18, 19, 21 and 22, is cast in one piece, and when pouring the molten lead or alloy, the plates are held in the proper position with respect to the cover member with the lugs extending within the mold and the molten metal poured over the lugs, and kept molten by a mass of the molten metal in a heated container that has a passage connected with this part of the mold. This fuses the lugs and causes them to become an integral part of the casting. The plates thus integrally attached to the cover members are then placed in the jar having been insulated from each other by separators and with the insulating member 14 between the positive and negative elements. The sealing material is then poured in and aided by the ribs 21, 22 and 26 or projections of any suitable shape or design securely holds the plates against possible displacement.

I claim as my invention:

1. In a battery cell, a jar, a cover member therefor, comprising a base portion which fits the inside of the jar, a smaller top portion, a sloping member integrally connecting said base portion and said top portion, a binding post on said top portion, ribs on said sloping member spaced from the side of the jar, and sealing material between said sloping member and the walls of said jar and covering said ribs.

2. In a battery cell, a jar, a cover comprising two members separated by insulating material, each member having a base portion which fits the inside of the jar, a smaller top portion, a sloping member integrally connecting said base portion and said top portion, a binding post on said top portion, ribs on said sloping member spaced from the side of the jar, and sealing material between said sloping member and the walls of said jar and covering said ribs.

3. In a battery cell, a jar, a cover comprising two metallic members separated by insulating material, each member having a base portion which fits the inside of the jar, a top portion, a sloping member integrally connecting said base portion and said top portion, ribs on said sloping member, and sealing material between said sloping member and the walls of said jar and covering said ribs, a set of metallic plates integrally connected to each cover member, the plates of one set being arranged alternately with the plates of the other set and spaced or insulated therefrom.

4. In a battery cell, a jar, a metallic cover member therefor comprising a base portion which fits the inside of the jar, a top portion, a sloping member integrally connecting said base portion and said top portion, a binding post on said top portion, ribs on said sloping member, sealing material between said sloping member and the walls of said jar and covering said ribs, and metallic plates having lugs thereon, said lugs and said cover member being fused together.

In testimony that I claim the foregoing I have hereunto set my hand at Madison, in the county of Dane and State of Wisconsin.

CARL F. HIGH.